United States Patent
Chen et al.

(10) Patent No.: US 11,569,680 B2
(45) Date of Patent: Jan. 31, 2023

(54) ELECTRONIC DEVICE AND POWER MANAGEMENT METHOD

(71) Applicant: QISDA CORPORATION, Taoyuan (TW)

(72) Inventors: Wen-Yuan Chen, New Taipei (TW); Ren-Yuan Cheng, Taipei (TW); Chen-Kang Wang, Taipei (TW)

(73) Assignee: Qisda Corporation, Taoyuan (TW)

( * ) Notice: Subject to any disclaimer, the term of this patent is extended or adjusted under 35 U.S.C. 154(b) by 786 days.

(21) Appl. No.: 16/521,556

(22) Filed: Jul. 24, 2019

(65) Prior Publication Data

US 2020/0336004 A1 Oct. 22, 2020

(30) Foreign Application Priority Data

Apr. 17, 2019 (CN) .......................... 201910307079.5

(51) Int. Cl.
*G06F 1/3206* (2019.01)
*H02J 9/06* (2006.01)
*G06F 9/4401* (2018.01)

(52) U.S. Cl.
CPC ............ *H02J 9/061* (2013.01); *G06F 1/3206* (2013.01); *G06F 9/442* (2013.01); *H02J 9/068* (2020.01)

(58) Field of Classification Search
CPC ......... H02J 9/061; H02J 9/068; G06F 1/3206; G06F 9/442
See application file for complete search history.

(56) References Cited

U.S. PATENT DOCUMENTS

| 5,514,946 A * | 5/1996 | Lin ..................... H02J 7/00036 |
| | | 702/187 |
| 5,804,894 A * | 9/1998 | Leeson ................ G01R 31/367 |
| | | 307/130 |
| 6,115,799 A * | 9/2000 | Ogawa ................. G06F 12/023 |
| | | 711/170 |
| 6,427,072 B1* | 7/2002 | Reichelt .............. H04B 1/1615 |
| | | 455/574 |
| 2015/0153810 A1* | 6/2015 | Sasidharan ............ G06F 1/329 |
| | | 713/320 |
| 2019/0278356 A1* | 9/2019 | Ueda ..................... G06F 1/3234 |

FOREIGN PATENT DOCUMENTS

| TW | 200819332 | 5/2008 |
| TW | 201347357 A | 11/2013 |

* cited by examiner

*Primary Examiner* — Gary Collins

(57) ABSTRACT

An electronic device includes a backup power supply unit, a first power management unit, a switch, a voltage detection unit, a processor and an electronic module. The first power management unit is coupled to the backup power supply unit and an external power supply unit. The switch is coupled to the first power management unit. The voltage detection unit is coupled to the external power supply unit and the switch. The processor is coupled to the voltage detection unit. The electronic module is coupled to the switch and the processor. When a voltage level of the external power supply unit is lower than a first predetermined level, the voltage detection unit outputs a detection signal. The switch is controlled by the detection signal to open to stop supplying power to the electronic module. The processor is controlled by the detection signal to execute a shutdown process.

8 Claims, 2 Drawing Sheets

ELECTRONIC DEVICE AND POWER MANAGEMENT METHOD

BACKGROUND OF THE INVENTION

1. Field of the Invention

The invention relates to an electronic device and a power management method and, more particularly, to an electronic device and a power management method capable of extending the service life of a backup power supply unit.

2. Description of the Prior Art

An on-board unit (OBU) is a device installed on a vehicle and used to communicate with a road side unit (RSU). When the vehicle passes though the road side unit, the on-board unit communicates with the road side unit to identify the vehicle and calculate a toll. In general, the power of the on-board unit is supplied by a battery of the vehicle and the on-board unit is equipped with a backup battery. Once the battery of the vehicle fails, a power management IC (PMIC) of the on-board unit will switch power to the backup battery automatically. Since the backup battery of the on-board unit is disposable (i.e. unrechargeable), how to avoid consuming the power of the backup battery to extend the service life of the backup battery has become a significant design issue.

SUMMARY OF THE INVENTION

An objective of the invention is to provide an electronic device and a power management method capable of extending the service life of a backup power supply unit, so as to solve the aforesaid problems.

According to an embodiment of the invention, an electronic device is connected to an external power supply unit. The electronic device comprises a backup power supply unit, a first power management unit, a switch, a voltage detection unit, a processor and an electronic module. The first power management unit is coupled to the backup power supply unit and the external power supply unit. The switch is coupled to the first power management unit. The voltage detection unit is coupled to the external power supply unit and the switch. The processor is coupled to the voltage detection unit. The electronic module is coupled to the switch and the processor. The first power management unit supplies power to the processor and the electronic module through the external power supply unit. When a voltage level of the external power supply unit is lower than a first predetermined level, the voltage detection unit outputs a detection signal. The switch is controlled by the detection signal to open to stop supplying power to the electronic module. The processor is controlled by the detection signal to execute a shutdown process.

In an embodiment, the electronic module comprises a second power management unit coupled to the switch.

In an embodiment, when the processor executes the shutdown process, the processor switches off a signal channel between the electronic module and the processor.

In an embodiment, the electronic device further comprises a controller coupled to the processor and the first power management unit, wherein after the processor executes the shutdown process, the processor transmits a request signal to the controller and the controller stops supplying power to the processor in response to the request signal.

In an embodiment, when the voltage level of the external power supply unit is lower than a second predetermined level, the first power management unit switches power from the external power supply unit to the backup power supply unit, and the second predetermined level is lower than the first predetermined level.

In an embodiment, the first power management unit comprises a booster and a power supply end, an input end of the booster is coupled to the backup power supply unit, an output end of the booster is coupled to an anode of a Schottky diode, and a cathode of the Schottky diode is coupled to the power supply end of the first power management unit.

According to another embodiment of the invention, a power management method is adapted to an electronic device. The electronic device is connected to an external power supply unit. The electronic device comprises a backup power supply unit, a processor and an electronic module. The power management method comprises steps of supplying power to the processor and the electronic module through the external power supply unit; and when a voltage level of the external power supply unit is lower than a first predetermined level, stopping supplying power to the electronic module and executing a shutdown process by the processor.

In an embodiment, when the processor executes the shutdown process, the processor switches off a signal channel between the electronic module and the processor.

In an embodiment, the electronic device further comprises a controller. After the processor executes the shutdown process, the processor transmits a request signal to the controller and the controller stops supplying power to the processor in response to the request signal.

In an embodiment, the power management method further comprises step of when the voltage level of the external power supply unit is lower than a second predetermined level, switching power from the external power supply unit to the backup power supply unit, wherein the second predetermined level is lower than the first predetermined level.

As mentioned in the above, the invention couples the switch to the first power management unit, the voltage detection unit and the electronic module. When the voltage level of the external power supply unit is higher than or equal to the first predetermined level, it means that the external power supply unit operates normally. At this time, the first power management unit supplies power to the processor and the electronic module through the external power supply unit. When the voltage level of the external power supply unit is lower than the first predetermined level, it means that the external power supply unit fails or operates abnormally. At this time, the voltage detection unit outputs the detection signal to the switch and the processor. Then, the switch is controlled by the detection signal to open to stop supplying power to the electronic module. At the same time, the processor is controlled by the detection signal to execute the shutdown process. Then, when the voltage level of the external power supply unit is lower than the second predetermined level, the first power management unit switches power from the external power supply unit to the backup power supply unit.

In other words, before switching power from the external power supply unit to the backup power supply unit, the invention has stopping supplying power to the electronic module by opening the switch. Accordingly, after switching power from the external power supply unit to the backup power supply unit, the electronic module will not consume the power of the backup power supply unit. Furthermore, since the processor has started to execute the shutdown process before switching power to the backup power supply unit, the invention can effectively save the power of the backup power supply unit consumed by the processor. Accordingly, the service life of the backup power supply unit can be extended.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
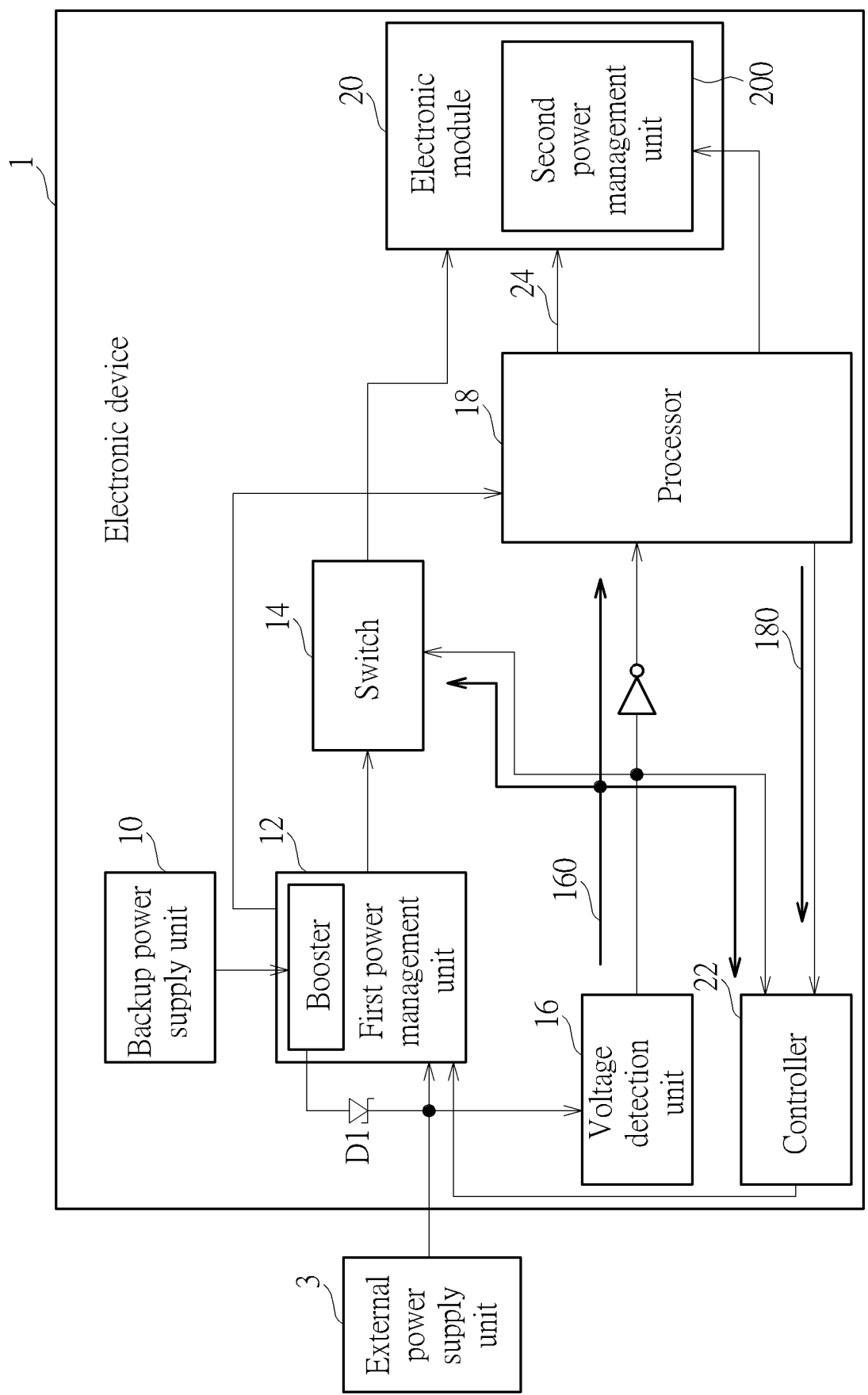
FIG. 1 is a functional block diagram illustrating an electronic device according to an embodiment of the invention.
Figure 2:
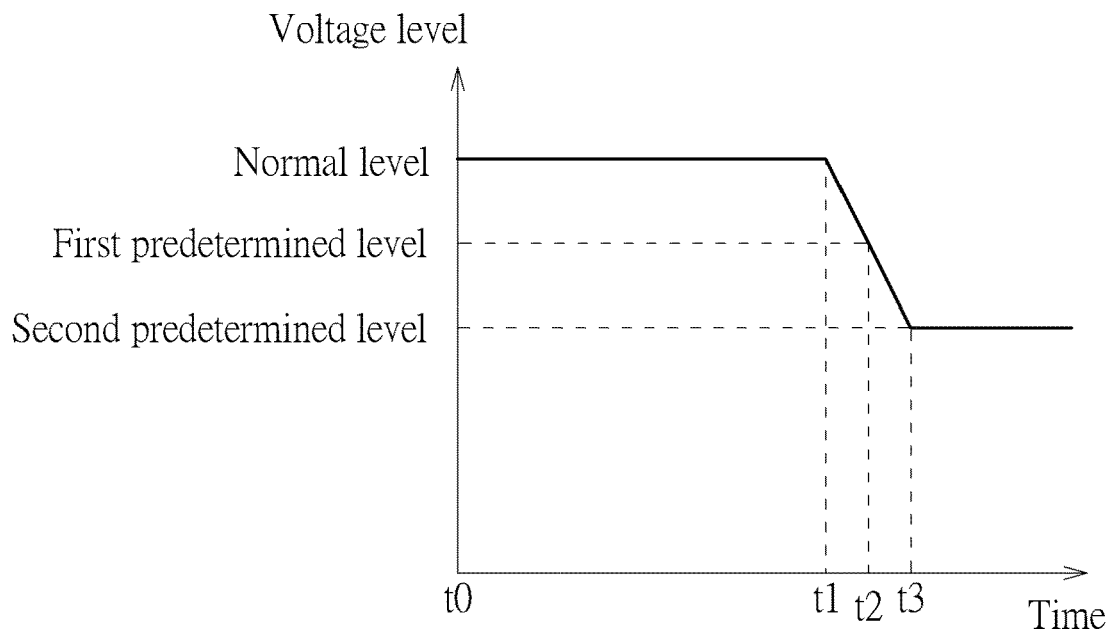
FIG. 2 is a diagram illustrating a relation between voltage level and time according to an embodiment of the invention.

Referring to FIGS. 1 and 2, FIG. 1 is a functional block diagram illustrating an electronic device 1 according to an embodiment of the invention and FIG. 2 is a diagram illustrating a relation between voltage level and time according to an embodiment of the invention.

As shown in FIG. 1, the electronic device 1 comprises a backup power supply unit 10, a first power management unit 12, a switch 14, a voltage detection unit 16, a processor 18, an electronic module 20 and a controller 22, wherein the first power management unit 12 comprises a booster and a power supply end, an input end of the booster is coupled to the backup power supply unit 10, an output end of the booster is coupled to an anode of a Schottky diode D1, and a cathode of the Schottky diode D1 is coupled to the power supply end of the first power management unit 12. The switch 14 is coupled to the first power management unit 12, the voltage detection unit 16 is coupled to the switch 14, the processor 18 is coupled to the voltage detection unit 16, the electronic module 20 is coupled to the switch 14 and the processor 18, and the controller 22 is coupled to the processor 18. In this embodiment, the electronic module 20 may comprise a second power management unit 200 coupled to the switch 14. Furthermore, the electronic device 1 is connected to an external power supply unit 3, wherein the first power management unit 12 and the voltage detection unit 16 are coupled to the external power supply unit 3.

In practical applications, the electronic device 1 may be, but not limited to, an on-board unit (OBU) and the external power supply unit 3 may be, but not limited to, a battery of a vehicle. The backup power supply unit 10 may be a battery installed in the electronic device 1. The voltage detection unit 16 may be a circuit for detecting a voltage level of the external power supply unit 3. The electronic module 20 may be a communication module (e.g. wireless wide area network (WWAN) module, WiFi module, Bluetooth module, etc.) or other electronic modules, and the processor 18 may be a communication processor or other processors for controlling the electronic module 20. It should be noted that the electronic device 1 may be equipped with one or more different electronic modules 20 according to practical applications. The first power management unit 12 and the second power management unit 200 may be power management IC (PMIC), wherein the first power management unit 12 is used to perform power management for the electronic device 1 and the second power management unit 200 is used to perform power management for the electronic module 20.

In general, the electronic device 1 may be further equipped with some necessary hardware or software components for specific purposes, such as a display panel, an input/output port, applications, a circuit board, a memory, etc., and it depends on practical applications.

As shown in FIG. 2, the invention may preset a normal level (e.g. 9.9V), a first predetermined level (e.g. 6.79V) and a second predetermined level (e.g. 6.5V) for the voltage level of the external power supply unit 3, wherein the first predetermined level is lower than the normal level, and the second predetermined level is lower than the first predetermined level. In FIG. 2, the voltage level of the external power supply unit 3 is the normal level and remains constant during a time period t0-t1, and the voltage level of the external power supply unit 3 decreases gradually during a time period t1-t3, wherein the voltage level of the external power supply unit 3 decreases to the first predetermined level at a time point t2, the voltage level of the external power supply unit 3 decreases to the second predetermined level at a time point t3, and the voltage level of the external power supply unit 3 remains at the second predetermined level after the time point t3. The time points t0, t1, t2 and t3 occur in sequence. When the voltage level of the external power supply unit 3 is higher than or equal to the first predetermined level (e.g. remains at the normal level) during the time period t0-t1, it means that the external power supply unit 3 operates normally. At this time, the switch 14 is closed and the first power management unit 12 supplies power to the processor 18 and the electronic module 20 through the external power supply unit 3.

When the external power supply unit 3 fails or operates abnormally, the voltage level of the external power supply unit 3 decreases gradually from the normal level. When the voltage level of the external power supply unit 3 is lower than the first predetermined level (the time point t2 shown in FIG. 2), it means that the external power supply unit 3 fails or operates abnormally. At this time, the voltage detection unit 16 outputs a detection signal 160 to the switch 14 and the processor 18. Then, the switch 14 is controlled by the detection signal 160 to open to stop supplying power to the electronic module 20. At the same time, the processor 18 is controlled by the detection signal 160 to execute a shutdown process. When the processor 18 executes the shutdown process, the processor 18 switches off a signal channel 24 between the electronic module 20 and the processor 18. Accordingly, when the switch 14 is opened to stop supplying power to the electronic module 20, the processor 18 stops transmitting signals to the electronic module 20, so as to prevent the processor 18 from transmitting signals to the electronic module 20 continuously to cause system loading. Furthermore, after the processor 18 executes the shutdown process, the processor 18 transmits a request signal 180 to the controller 22. At this time, the controller 22 stops supplying power to the processor 18 in response to the request signal 180.

When the voltage level of the external power supply unit 3 is lower than the second predetermined level (the time point t3 shown in FIG. 2), the first power management unit 12 switches power from the external power supply unit 3 to the backup power supply unit 10. Accordingly, the electronic device 1 may operate normally through the backup power supply unit 10 while the external power supply unit 3 fails or operates abnormally.

Before switching power from the external power supply unit 3 to the backup power supply unit 10, the invention has stopping supplying power to the electronic module 20 by opening the switch 14. Accordingly, after switching power from the external power supply unit 3 to the backup power supply unit 10, the electronic module 20 will not consume the power of the backup power supply unit 10. The first power management unit 12 keeps supplying power to the processor 18 through the backup power supply unit 10 before the shutdown process is completed by the processor 18. Furthermore, since the processor 18 has started to execute the shutdown process before switching power to the backup power supply unit 10, the invention can effectively save the power of the backup power supply unit 10 consumed by the processor 18. Accordingly, the service life of the backup power supply unit 10 can be extended.

Figure 3:
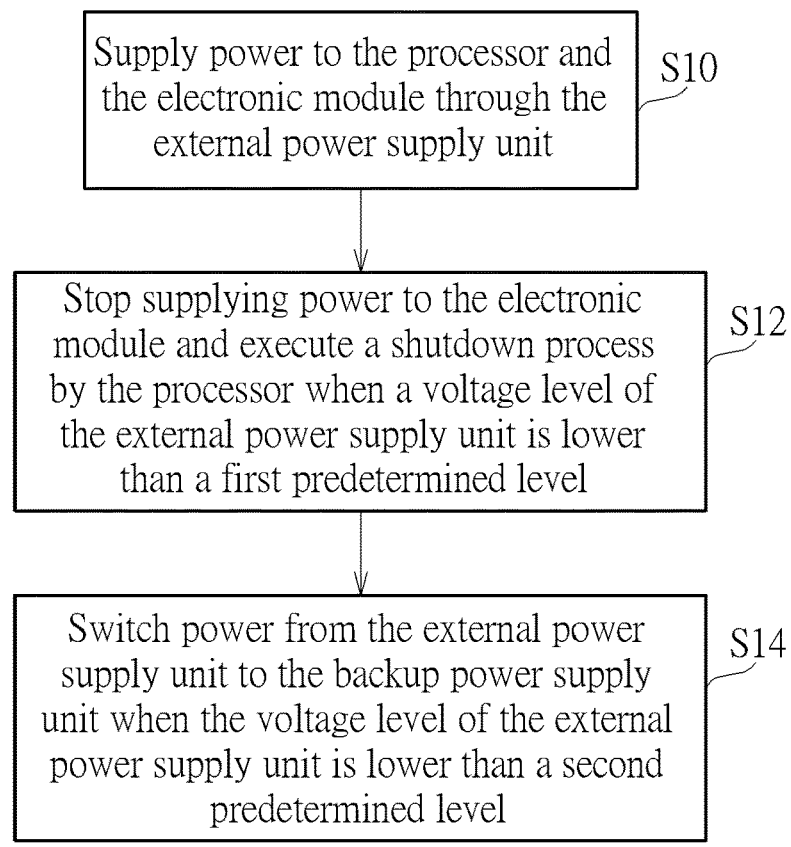
FIG. 3 is a flowchart illustrating a power management method according to an embodiment of the invention.

Referring to FIG. 3, FIG. 3 is a flowchart illustrating a power management method according to an embodiment of the invention. The power management method shown in FIG. 3 is adapted to the electronic device 1 shown in FIG. 1. First, step S10 is performed to supply power to the processor 18 and the electronic module 20 through the external power supply unit 3. Then, step S12 is performed to stop supplying power to the electronic module 20 and execute a shutdown process by the processor 18 when a voltage level of the external power supply unit 3 is lower than a first predetermined level. When the processor 18 executes the shutdown process, the processor 18 switches off a signal channel 24 between the electronic module 20 and the processor 18. Furthermore, after the processor 18 executes the shutdown process, the processor 18 transmits a request signal 180 to the controller 22, such that the controller 22 stops supplying power to the processor 18 in response to the request signal 180. Then, step S14 is performed to switch power from the external power supply unit 3 to the backup power supply unit 10 when the voltage level of the external power supply unit 3 is lower than a second predetermined level.

It should be noted that the detailed embodiments of the power management method of the invention are mentioned in the above and those will not be depicted herein again. Still further, each part or function of the control logic of the power management method of the invention may be implemented by a combination of software and hardware.

As mentioned in the above, the invention couples the switch to the first power management unit, the voltage detection unit and the electronic module. When the voltage level of the external power supply unit is higher than or equal to the first predetermined level, it means that the external power supply unit operates normally. At this time, the first power management unit supplies power to the processor and the electronic module through the external power supply unit. When the voltage level of the external power supply unit is lower than the first predetermined level, it means that the external power supply unit fails or operates abnormally. At this time, the voltage detection unit outputs the detection signal to the switch and the processor. Then, the switch is controlled by the detection signal to open to stop supplying power to the electronic module. At the same time, the processor is controlled by the detection signal to execute the shutdown process. Then, when the voltage level of the external power supply unit is lower than the second predetermined level, the first power management unit switches power from the external power supply unit to the backup power supply unit.

In other words, before switching power from the external power supply unit to the backup power supply unit, the invention has stopping supplying power to the electronic module by opening the switch. Accordingly, after switching power from the external power supply unit to the backup power supply unit, the electronic module will not consume the power of the backup power supply unit. Furthermore, since the processor has started to execute the shutdown process before switching power to the backup power supply unit, the invention can effectively save the power of the backup power supply unit consumed by the processor. Accordingly, the service life of the backup power supply unit can be extended.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device connected to an external power supply unit, the electronic device comprising:
   a backup power supply unit;
   a first power management unit coupled to the backup power supply unit and the external power supply unit;
   a switch coupled to the first power management unit;
   a voltage detection unit coupled to the external power supply unit and the switch;
   a processor coupled to the voltage detection unit; and
   an electronic module coupled to the switch and the processor;
   wherein the first power management unit supplies power to the processor and the electronic module through the external power supply unit; when a voltage level of the external power supply unit is lower than a first predetermined level, the voltage detection unit outputs a detection signal, the switch is controlled by the detection signal to open to stop supplying power to the electronic module, and the processor is controlled by the detection signal to execute a shutdown process; when the voltage level of the external power supply unit is lower than a second predetermined level, the first power management unit switches power from the external power supply unit to the backup power supply unit, and the second predetermined level is lower than the first predetermined level.

2. The electronic device of claim 1, wherein the electronic module comprises a second power management unit coupled to the switch.

3. The electronic device of claim 1, wherein when the processor executes the shutdown process, the processor switches off a signal channel between the electronic module and the processor.

4. The electronic device of claim 1, further comprising a controller coupled to the processor and the first power management unit, wherein after the processor executes the shutdown process, the processor transmits a request signal to the controller and the controller stops supplying power to the processor in response to the request signal.

5. The electronic device of claim 1, wherein the first power management unit comprises a booster and a power supply end, an input end of the booster is coupled to the backup power supply unit, an output end of the booster is coupled to an anode of a Schottky diode, and a cathode of the Schottky diode is coupled to the power supply end of the first power management unit.

6. A power management method adapted to an electronic device, the electronic device being connected to an external power supply unit, the electronic device comprising a backup power supply unit, a processor and an electronic module, the power management method comprising steps of:

supplying power to the processor and the electronic module through the external power supply unit;

when a voltage level of the external power supply unit is lower than a first predetermined level, stopping supplying power to the electronic module and executing a shutdown process by the processor; and when the voltage level of the external power supply unit is lower than a second predetermined level, switching power from the external power supply unit to the backup power supply unit, wherein the second predetermined level is lower than the first predetermined level.

7. The power management method of claim 6, wherein when the processor executes the shutdown process, the processor switches off a signal channel between the electronic module and the processor.

8. The power management method of claim 6, wherein the electronic device further comprises a controller; after the processor executes the shutdown process, the processor transmits a request signal to the controller and the controller stops supplying power to the processor in response to the request signal.

* * * * *